US010889389B2

(12) United States Patent
Boyle et al.

(10) Patent No.: US 10,889,389 B2
(45) Date of Patent: Jan. 12, 2021

(54) ELECTRONIC PRESSURE REGULATION SYSTEM WITH PROPORTIONAL CONTROL VALVE

(71) Applicant: Marotta Controls, Inc., Montville, NJ (US)

(72) Inventors: Patrick Boyle, Montville, NJ (US); James LaGrotta, Montville, NJ (US)

(73) Assignee: Marotta Controls, Inc., Montville, NJ (US)

( * ) Notice: Subject to any disclaimer, the term of this patent is extended or adjusted under 35 U.S.C. 154(b) by 650 days.

(21) Appl. No.: 15/497,989

(22) Filed: Apr. 26, 2017

(65) Prior Publication Data

US 2018/0312279 A1 Nov. 1, 2018

(51) Int. Cl.
| | |
|---|---|
| *B64G 1/40* | (2006.01) |
| *F16K 49/00* | (2006.01) |
| *B64G 1/10* | (2006.01) |
| *F16K 31/06* | (2006.01) |
| *G05D 7/03* | (2006.01) |

(52) U.S. Cl.
CPC .............. *B64G 1/402* (2013.01); *B64G 1/10* (2013.01); *F16K 31/0651* (2013.01); *F16K 31/0655* (2013.01); *F16K 49/002* (2013.01); *G05D 7/03* (2013.01)

(58) Field of Classification Search
CPC ...... G05D 7/03; G05D 7/0617; G05D 7/0629; G05D 7/0694; B64C 1/40; B64C 1/402; B64C 1/10; F16K 31/0651; F16K 31/0655; F16K 49/002
See application file for complete search history.

(56) References Cited

U.S. PATENT DOCUMENTS

| | | | |
|---|---|---|---|
| 3,733,459 A | * | 5/1973 | Lengstorf ............. F16K 49/002 |
| | | | 219/201 |
| 3,814,376 A | | 6/1974 | Reinicke |
| 5,501,425 A | | 3/1996 | Reinicke et al. |
| 5,868,375 A | | 2/1999 | Reinicke et al. |
| 6,026,847 A | | 2/2000 | Reinicke et al. |

(Continued)

FOREIGN PATENT DOCUMENTS

| | | | |
|---|---|---|---|
| CN | 106564623 A | * | 4/2017 |
| JP | 2004197592 A | * | 7/2004 |

*Primary Examiner* — Benjamin P Lee
(74) *Attorney, Agent, or Firm* — Lerner, David, Littenberg, Krumholz & Mentlik, LLP (57) ABSTRACT

An electronic pressure regulation system includes an electronic control unit and a fluid assembly, with the fluid assembly including a fluid control branch having a proportional control valve and a heater. The heater may be a strip heater applied to or a coil wrapped around an external surface of the proportional control valve. The system may further include a latching isolation valve. A secondary fluid control branch can be included, and the fluid control branches can be in parallel. The electronic pressure regulation system can be included in an all-electric satellite. Another electronic pressure regulation system includes an electronic control unit and a fluid assembly, with the fluid assembly including a fluid control branch having a proportional control valve, the proportional control valve including two independently-controlled coils for magnetostrictive actuation.

16 Claims, 9 Drawing Sheets

(56) References Cited

U.S. PATENT DOCUMENTS

| | | | | |
|---|---|---|---|---|
| 6,068,010 A | * | 5/2000 | Reinicke | B64G 1/26 137/1 |
| 6,286,304 B1 | * | 9/2001 | Back | F03H 1/0012 60/202 |
| 9,003,767 B2 | * | 4/2015 | Marchandise | B64G 1/405 60/202 |
| 9,188,989 B1 | * | 11/2015 | Mudd | G05D 7/0635 |
| 2004/0250855 A1 | * | 12/2004 | Hyde | F16K 49/002 137/341 |
| 2005/0109771 A1 | * | 5/2005 | Bower | F16K 27/003 219/635 |
| 2005/0238506 A1 | * | 10/2005 | Mescher | A61M 5/14276 417/413.1 |
| 2010/0139239 A1 | * | 6/2010 | Gronland | B64G 1/26 60/204 |
| 2013/0081712 A1 | * | 4/2013 | Kouketsu | F16K 49/002 137/334 |
| 2013/0104992 A1 | * | 5/2013 | Yednak, III | C23C 16/45561 137/1 |
| 2015/0034168 A1 | * | 2/2015 | Shreve | G01N 30/32 137/14 |
| 2015/0045971 A1 | * | 2/2015 | Endel | F23N 5/184 700/282 |
| 2016/0177665 A1 | * | 6/2016 | Pollard | F16K 49/002 166/57 |
| 2016/0369910 A1 | | 12/2016 | Kluz et al. | |
| 2017/0184220 A1 | * | 6/2017 | Ishikawa | F16K 49/002 |
| 2018/0119682 A1 | * | 5/2018 | Zurbach | B64G 1/402 |
| 2019/0368633 A1 | * | 12/2019 | Sandiford | F16K 49/002 |

\* cited by examiner

ELECTRONIC PRESSURE REGULATION SYSTEM WITH PROPORTIONAL CONTROL VALVE

BACKGROUND OF THE INVENTION

The present invention generally relates to pressure regulation systems, and more particularly to electronic pressure regulation systems that provide heat to pressure-reducing valves to enhance the efficiency of the propellant fluid flow through the valves.

The propulsion demands for the next generation of all-electric satellites offer unique challenges for propellant delivery systems. Electric orbit-raising satellites require accurate and flexible pressure control systems which can be used for electric propulsion ("EP") thruster systems with varied flow demands. New propulsion capabilities necessary for all-electric satellites require advanced pressure feedback control systems with higher flow rates, particularly for electric orbit raising up to the geostationary ring. For example, one such satellite system will perform orbit-raising, station-keeping, and de-orbit maneuvers with electric propulsion.

While both mechanical and electronic pressure regulators can be utilized in these systems, electronic pressure regulation offers advantages in accuracy, remote adjustability, robustness, and lifetime stability when compared with equivalent mechanical regulators. For example, using xenon gas for propellant feed systems involves regulation that has particular challenges due to Joule-Thompson cooling and the resulting two-phase flow.

There remains room for improvement in the design and use of electronic pressure regulation systems, particularly with regard to the ability of such systems to operate efficiently at high inlet pressures.

BRIEF SUMMARY OF THE INVENTION

A first aspect of the present invention is an electronic pressure regulation system including an electronic control unit and a fluid assembly, the fluid assembly including a fluid control branch having a proportional control valve and a heater.

In accordance with other embodiments of the first aspect, the heater may be a strip heater applied to an external surface of the proportional control valve. The strip heater may be a flexible, planar sheet in which a heating element is disposed. The flexible, planar sheet may be comprised of polyimide or the like. The strip heater may include a thermometer. The heater may be secured to the proportional control valve with tape or film. The heater may be a coil wrapped around an external surface of the proportional control valve.

The fluid assembly may further include a latching isolation valve. The fluid assembly may further include a secondary fluid control branch having a proportional control valve and a heater. The fluid control branches may be in parallel. The secondary fluid control branch may further include a latching isolation valve.

The system may further include a pressure transducer interfacing with an upstream node to provide pressure telemetry of a high-pressure side of the system. The system may further include a second pressure transducer interfacing with the upstream node to provide pressure telemetry of the high-pressure side of the system, the pressure transducers operating as a redundant pair.

The system may further include a pressure transducer interfacing with a downstream node to provide pressure telemetry of a low-pressure side of the system. The system may further include a second pressure transducer interfacing with the downstream node to provide pressure telemetry of the low-pressure side of the system, the pressure transducers operating as a redundant pair.

The system may further include a temperature sensor interfacing with a downstream node. The system may further include a second temperature sensor interfacing with the downstream node, the temperature sensors operating as a redundant pair.

The proportional control valve may be magnetostrictively-actuated including an axial expansion element. The axial expansion element may be comprised of Terfenol-D. The system may further include a quantity of xenon as a propellant.

A second aspect of the present invention is an all-electric satellite including an electronic pressure regulation system, the electronic pressure regulation system including an electronic control unit and a fluid assembly, the fluid assembly including a fluid control branch having a proportional control valve and a heater.

A third aspect of the present invention is an electronic pressure regulation system including an electronic control unit and a fluid assembly, the fluid assembly including a fluid control branch having a proportional control valve, the proportional control valve including two independently-controlled coils for magnetostrictive actuation.

In accordance with other embodiments of the third aspect, the two independently-controlled coils may be configured to create an actuating magnetic field and to create heat that is transferred to a liquid propellant. The liquid propellant may pass along a path around one or both of the coils at a high-pressure side of the valve.

A fourth aspect of the present invention is a method of using an electronic pressure regulation system including an electronic control unit and a fluid assembly, the fluid assembly including a fluid control branch having a proportional control valve, the proportional control valve including two independently-controlled coils for magnetostrictive actuation, the two independently-controlled coils being configured to create an actuating magnetic field and to create heat that is transferred to a liquid propellant, and the liquid propellant passing along a path around one or both of the coils at a high-pressure side of the valve, the method including a step of driving the coils in complement to create constructively-interfering magnetic fields in magnetostrictive material of the valve and to actuate the valve.

A fifth aspect of the present invention is a method of using an electronic pressure regulation system including an electronic control unit and a fluid assembly, the fluid assembly including a fluid control branch having a proportional control valve, the proportional control valve including two independently-controlled coils for magnetostrictive actuation, the two independently-controlled coils being configured to create an actuating magnetic field and to create heat that is transferred to a liquid propellant, and the liquid propellant passing along a path around one or both of the coils at a high-pressure side of the valve, the method including a step of driving the coils in opposition to create destructively-interfering magnetic fields in magnetostrictive material of the valve which do not actuate the valve.

In accordance with other embodiments of the fifth aspect, resistive heat generated in the coils creates excess heat, and the method may further include transferring the excess heat to the liquid propellant.

DETAILED DESCRIPTION

Figure 1:
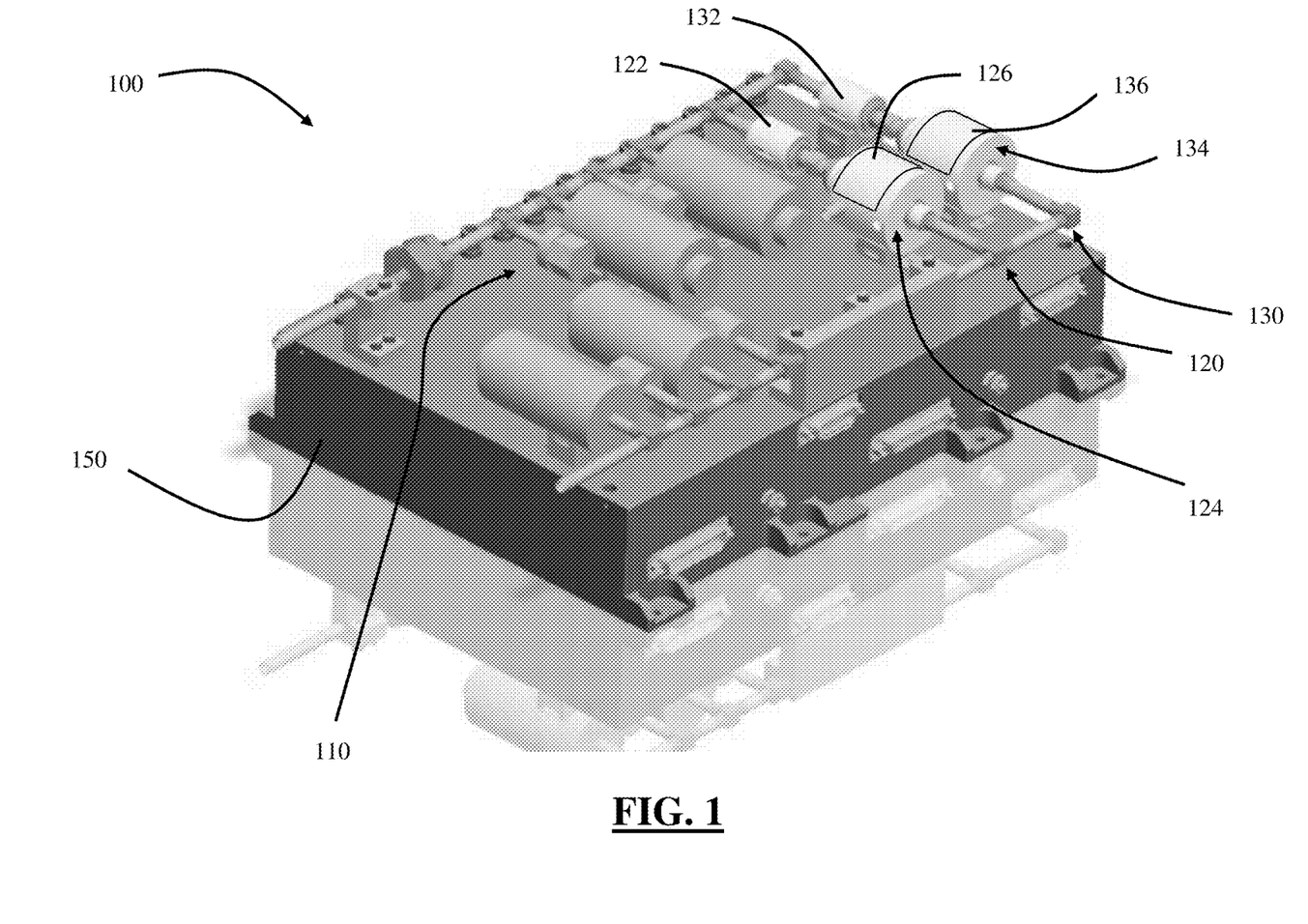
FIG. 1 is a perspective view of an improved electronic pressure regulation system in accordance with a first embodiment of the present invention.
Figure 2:
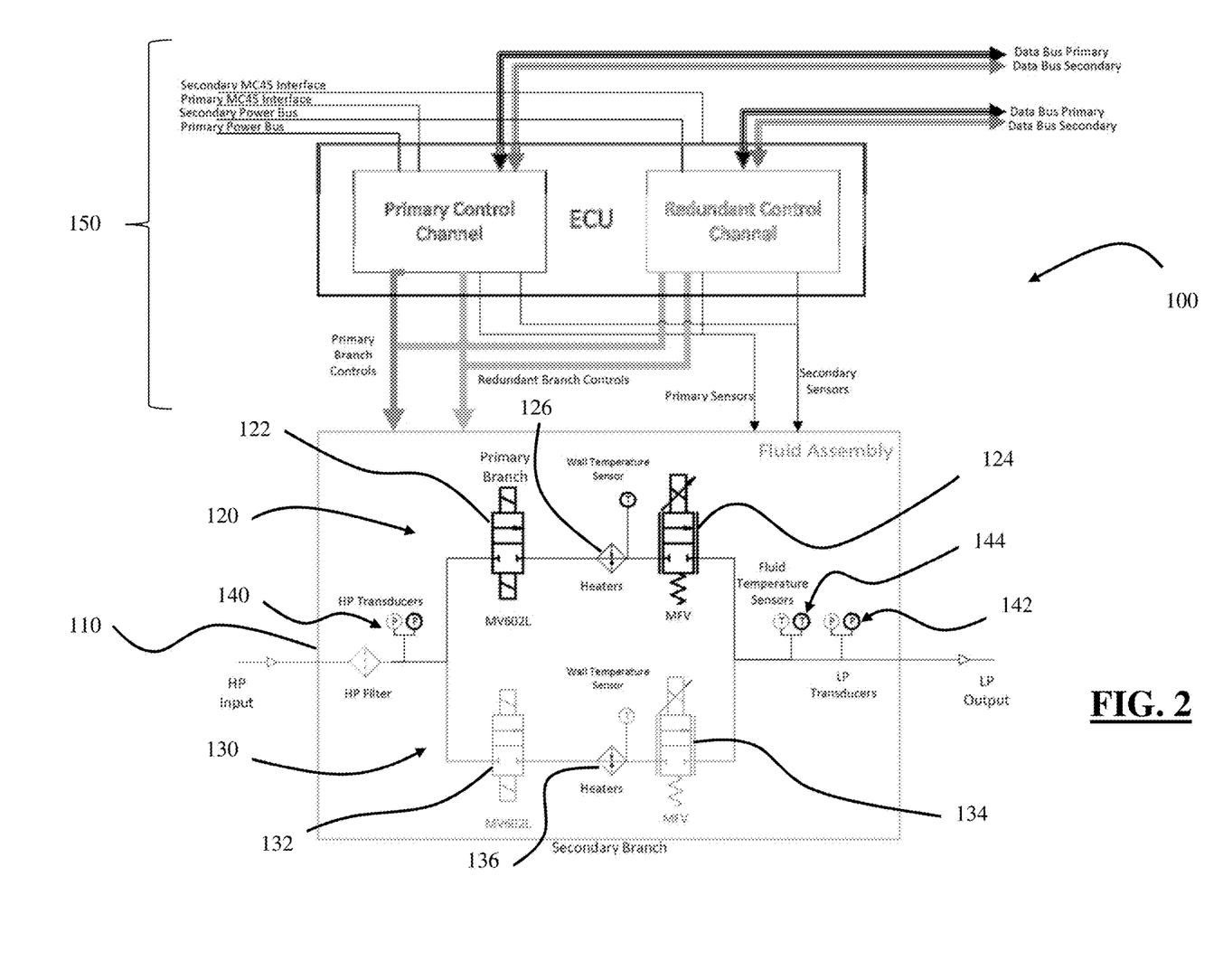
FIG. 2 is a system layout of the pressure regulation system shown in FIG. 1.

An improved electronic pressure regulation system 100 is shown in FIG. 1, and a system layout of system 100 is shown in FIG. 2. System 100 is a single-stage, cold-redundant, standalone system and is configured, for example, to meet the propellant pressure management demands of an all-electric satellite. Electronic pressure regulation offers the benefit of remote set-point adjustability, allowing multiple operating points at thruster level, and flexibility in propellant management. This allows thruster operating points to be changed from the ground as new issues impact a mission. System 100 achieves these objectives while incorporating improved features for efficient and optimized performance.

System 100 includes a fluid assembly 110 mounted atop an electronic control unit 150. Fluid assembly 110 contains two parallel fluid control branches 120, 130, which are redundant. First fluid control branch 120 includes a latching isolation valve 122, a proportional control valve 124, and a heater 126. Second fluid control branch 130 similarly includes a latching isolation valve 132, a proportional control valve 134, and a heater 136. Latching isolation valves 122, 132 are each magnetically-operated two-position valves having an armature serving a movable valve element and which is movable to and latched in its positions solely by magnetic flux. Each valve 122, 132 is moved to a position by applying current to one solenoid or the other and is latched in either position by a set of permanent magnets whose flux is automatically directed to the proper direction for holding the armature in the selected position. A first pressure transducer, and preferably a first redundant pair of pressure transducers 140, interfaces with the upstream node at a high-pressure side of system 100 to provide pressure telemetry. Similarly, a second pressure transducer, and preferably a second redundant pair of pressure transducers 142, interfaces with the downstream node at a low-pressure side of system 100. This high- and low-pressure telemetry along with downstream fluid temperature telemetry informed by a temperature sensor, and preferably a pair of temperature sensors 144, are supplied to the associated vehicle during operation of system 100.

System 100 also has two isolation barriers and redundant electronic control units integrated with the assembly. The electronic control units are identical, and each operates in conjunction with one of fluid control branches 120, 130. The electronic control units are housed within electronic control unit 150. Each electronic control unit runs on electric power taken from the associated spacecraft and takes commands from the spacecraft to operate valves 124, 134 accordingly to regulate pressure. Measured pressure readings are also communicated from the electronic control units to the spacecraft.

During electric propulsion facilitated by system 100, no oxygen or traditional fuel is required. Instead, particles of a propellant, such as xenon for example, are ionized and accelerated through proportional control valves 124, 134 to allow system 100 to accomplish pressure control of the propellant. System 100 operates with xenon due to its ability to ionize easily and pack densely. Of course other types of propellant can be used, such as other noble gases. In particular, xenon, krypton, helium, nitrogen, and iodine may be used as propellants. In this way, system 100 is an electronically-controlled feedback pressure control system.

Figure 3:
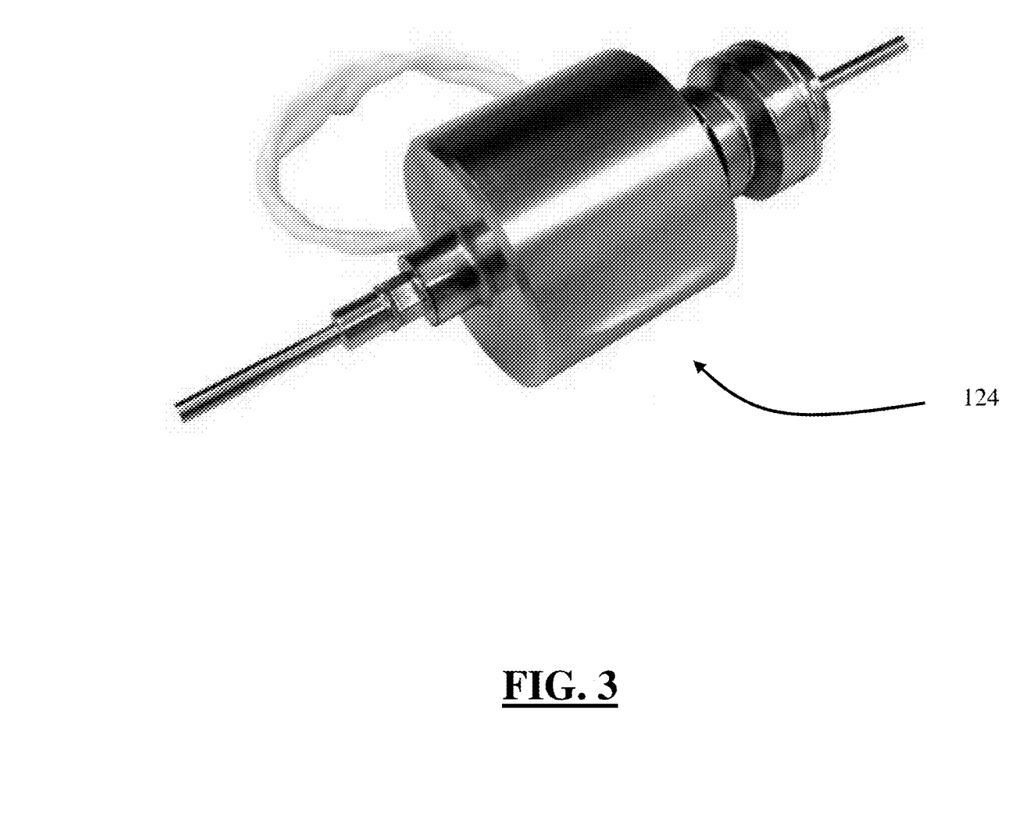
FIG. 3 is a perspective view of a proportional control valve used in the pressure regulation system shown in FIG. 1.
Figure 4:
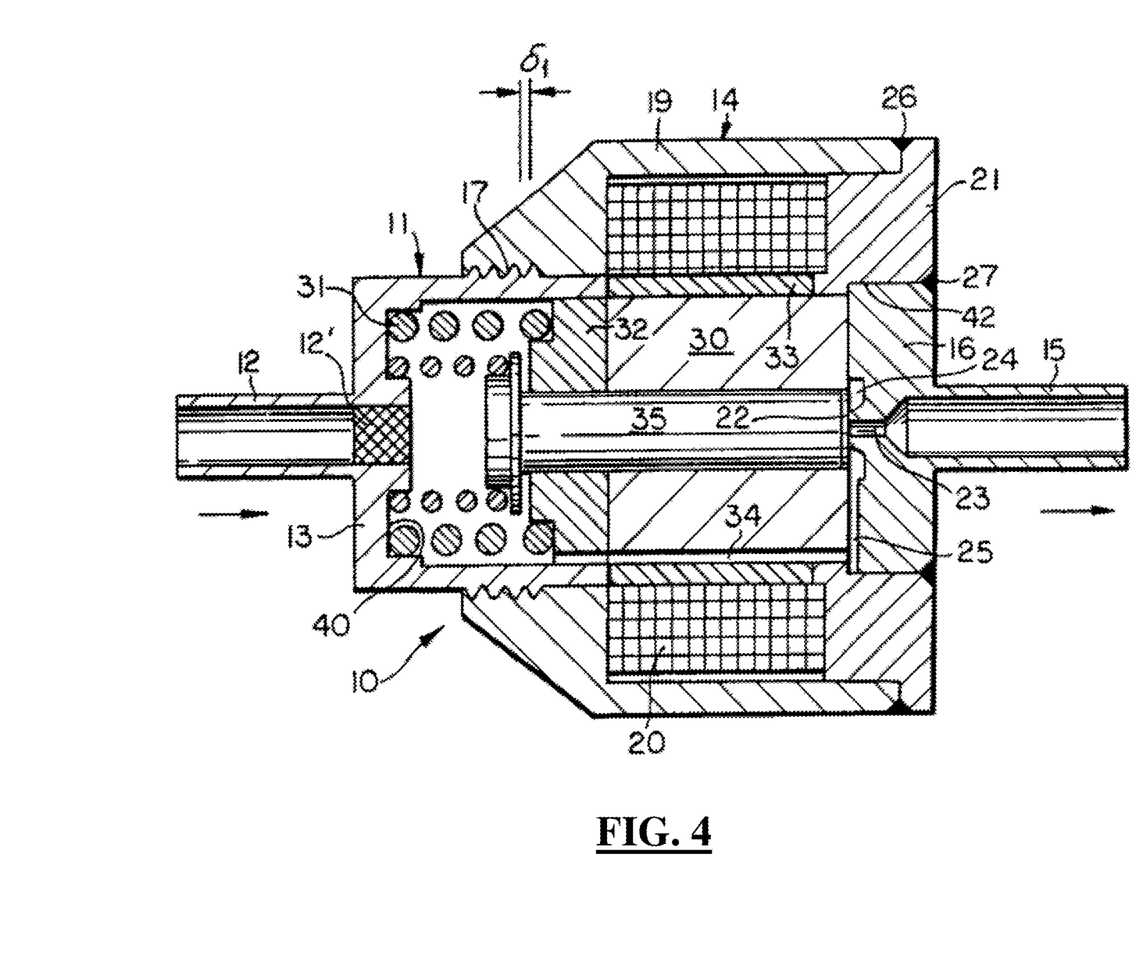
FIGS. 4 and 5 are side sectional views of another proportional control valve used in the pressure regulation system shown in FIG. 1.
Figure 5:
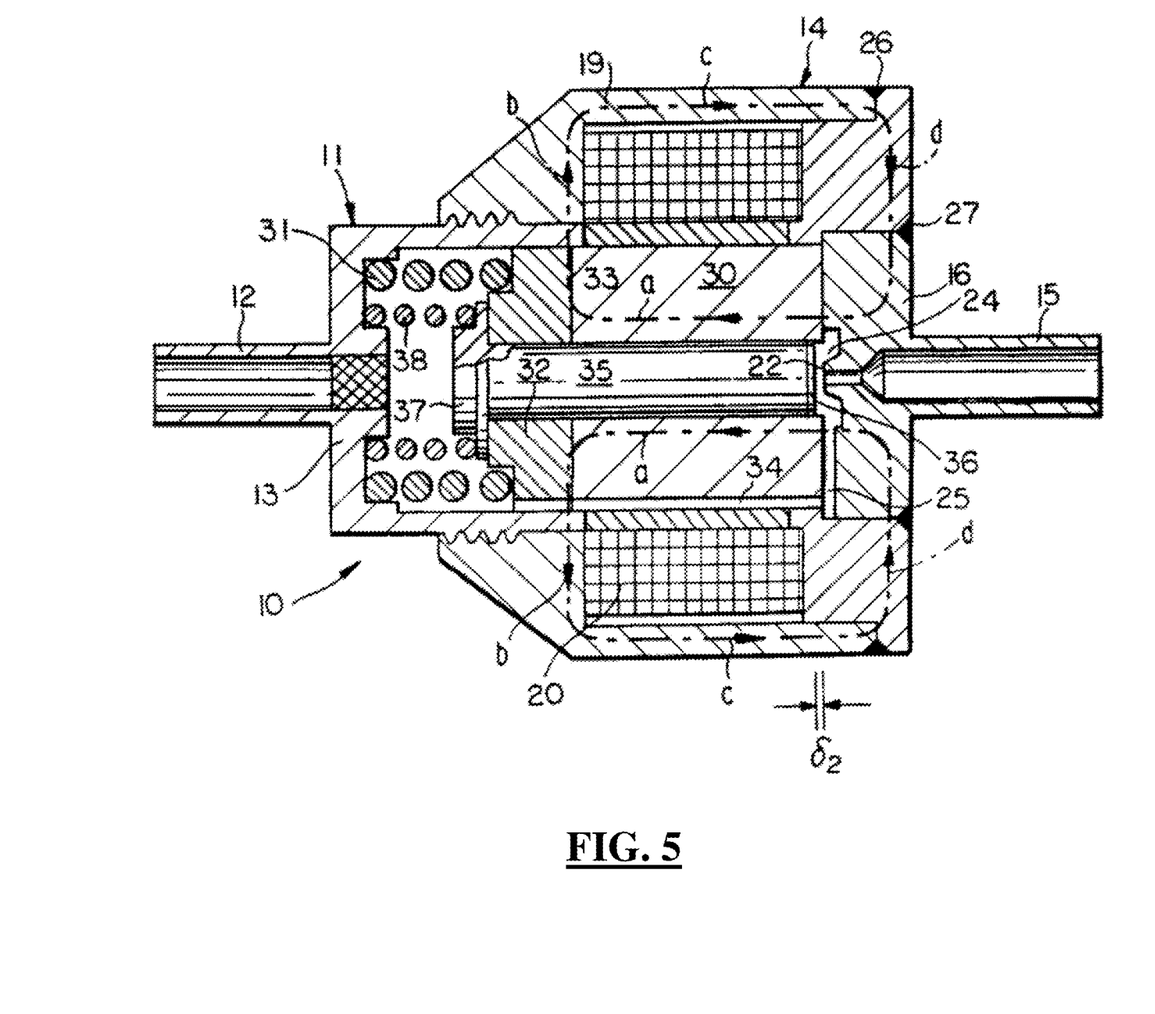

Each proportional control valve 124, 134, one of which is shown in FIG. 3, is a single-stage, normally-closed magnetostrictively-actuated valve operated with a dedicated electronic control unit. An embodiment of a similar proportional control valve is shown in FIGS. 4 and 5. The valve includes a body 10, consisting of an upstream cup-shaped part 11 having a central inlet-port connection 12 to its closed left-end wall 13, and annular downstream parts 19, 21, 33, collectively marked 14, and having a central outlet-port connection 15 to a closed right-end wall 16. The body parts 11, 16, 19, 21, 30 and 32 are of ferromagnetic material, and the part 33 is an inner sleeve of a material which is not ferromagnetic. The part 19 is an outer sleeve or skirt portion of body 10 and has an inwardly flanged upstream end which telescopically laps the upstream body part 11. Body parts 11, 19 are shown connected and sealed by a circumferential weldment 17. An inlet filter 12' in port 12 assures that particles borne by inlet pressurized-fluid flow will not impair valve operation.

More specifically, the outer sleeve or skirt part 19 of body part 14 features a counterbore for reception and location of an electromagnetic coil winding 20. Inner sleeve 33 provides coaxial support of winding 20, and the downstream annulus 21 closes the counterbore for axial retention of winding 20. The downstream end-wall part 16 seats against the inner end of a counterbore in annulus 21 and is centrally formed at its upstream end with an annular valve-seat configuration, which surrounds a passage to outlet port 15 and which projects from an annular manifolding concavity. One or more radial grooves 25 communicate inlet-gas flow to the manifold 24. A circumferential weld 27 is provided between end-wall part 16 and annulus 21. Parts 19, 21 have an axially extending telescopic fit that is sealed.

A cylindrical annulus or core 30 of magnetostrictive material is retained, preferably with close clearance, within the continuous bore of parts 11, 33 and 21. A stiffly compliant spring 31, seated within body part 11, applies prestressing compressional force, via a shouldered plate 32, to the upstream end face of the magnetostrictive annulus 30. The fit of parts 30, 32 to the continuous bore of parts 11, 33, 21 is sufficiently loose to allow for magnetostrictive elongation of part 30, pursuant to electrical excitation of coil 20. As best seen in FIG. 5, such excitation of coil 20 establishes toroidal circulation of magnetic flux, via inductive coupling to the magnetostrictive part 30 along an inner axial path leg a, with resultant path completion radially outward via a path leg b, an outer axial path leg c, and back to path leg a via a radially inward path leg d. One or more longitudinal grooves 34 in the periphery of plate 32 and of core 30 align with the one or more radial grooves 25 of body-closure wall 16, to provide for pressurized fluid communication from inlet port 12 to the manifold 24.

An elongate cylindrical poppet-valve member 35 has guided support for limited longitudinal displaceability from its normally closed downstream-end contact with the valve-seat formation 22. Preferably, this downstream end of the valve member is coated or otherwise finished with a closure pad or coating of elastomeric material or a plastic material such as nylon or Teflon. And valve member or poppet 35 features a radial-flange formation 37 at its upstream end for shouldered reception of stiffly compliant preloading force, shown to be provided by a coil spring 38 that is nested within the prestressing spring 31 and independently referenced to the body-closure wall 13.

At present, a preference is stated for use of a magnetostrictive material known as Terfenol-D as the material of core magnetostrictive member 30, which is a specially formulated alloy of terbium, dysprosium and iron with operating condition specific stoichiometry. Preferably, the material of poppet-valve member 35 has substantially the same temperature coefficient of expansion as the material of core magnetostrictive member 30. For the indicated use of Terfenol-D, the desired substantial match of thermal coefficients results from use of the titanium alloy Ti-6Al-4V or the nickel alloy Inconel 722 as the material of valve member 35, thereby effectively neutralizing the effects of differential thermal expansion of parts 30, 35.

As with ferromagnetic body parts 11, 14, 19, 21, 16, plate 32 is suitably of magnetic-quality stainless steel. And the bore of plate 32 may have a coating of Teflon or other low-friction material for smooth axially slidable displaceability with respect to the upstream (i.e. flanged) end of poppet 30. Winding 20 may be itself a sub-assembly, pre-potted in a suitable potting compound and defining a solid cylindrical annulus, with precisely spaced end-wall surfaces, and with a bore having a closely supporting fit to the non-magnetic sleeve 33.

Other embodiments of magnetostrictively actuated valves similar to those described herein are disclosed in U.S. Pat. Nos. 5,501,425, 5,868,375, and 6,026,847, the disclosures of which are hereby incorporated by reference herein. Other embodiments of the latching isolation valve similar to those described herein are disclosed in U.S. Pat. No. 3,814,376, the disclosure of which is hereby incorporated by reference herein.

As indicated above, valves 124, 134 are each actuated by an axial expansion element made of Terfenol-D, which is a magnetostrictive material that expands axially in the presence of a similarly-oriented magnetic field. This magnetic field is supplied by a coil (such as electromagnetic coil winding 20) in each valve 124, 134, which provides fine control of EP propellant flow with an extremely tight, normally-closed internal seal. The expansion element is wetted and enclosed within the fully-welded valve 124, 134, so there are no dynamic seals or pass-throughs in the design, eliminating external leak paths. Instead, the magnetic field operates through the pressure boundary of the respective valve 124, 134. This system design results in high-accuracy, adjustable pressure control performance without the steady-state droop of a mechanical pressure regulator, and without the accumulation volume associated with a bang-bang design.

Regulating pressure of a propellant such as xenon with a proportional valve has particular challenges due to Joule-Thompson cooling of the propellant through the pressure drop at the throat of valves 124, 134. During use of system 100, xenon in liquid form is filtered at an inlet (such as central inlet-port connection 12) of each valve 124, 134. System 100 is designed to control the pressure of xenon as it moves through system 100 by first throttling the liquid xenon propellant flow using proportional control valves 124, 134. As it is throttled through valves 124, 134, the xenon is converted from a liquid to a gas, thus creating a potential for a saturated liquid/vapor mixture (2-phase flow) as a result of Joule-Thompson cooling. That is, at high inlet pressures, the cooling of the xenon due to throttling can result in the liquid transforming to the saturated liquid/vapor mixture. System 100 does not include an accumulation volume downstream of the regulator to counteract this occurrence of 2-phase flow. The very large pressure drop can thus be difficult to control due to the 2-phase state of the propellant. In an exemplary process, this pressure drop can be defined by the pressure of the propellant reduced from about 185 bar, for example, to about 2 bar, for example through valves 124, 134.

To address this deficiency, each fluid control branches 120, 130 of system 100 includes a respective heater 126, 136 in order to counteract and alleviate the 2-phase flow tendency of the propellant as it is throttled. Utilization of heaters 126, 136 results in less liquid propellant at the low pressure end of each valve 124, 134. Adding heat to the propellant at the point at which it transitions from liquid to gas helps to avoid this 2-phase flow and ultimately requires less liquid propellant during the throttling process.

The application of heat to valves 124, 134 is accomplished with electrical power supplied by the electronic control unit and can be done in different ways. In one embodiment, a wrap heater or a strip heater is provided around an external surface of each valve 124, 134, as shown in FIG. 1. A heater 126 can be wrapped partially or entirely circumferentially around the external surface of valve 124. This can be a flexible, planar sheet of, for example, polyimide in which a heating element is disposed, with the sheet applied to the exterior surface of the valve. In some instances, Kapton tape or another plastic film can be used to secure a heater to a valve. Heaters 126, 136 each include a resistance thermal device ("RTD") as sensors or thermometers to measure temperature, which can be fed back to electronic control unit 150 as feedback to inform system 100 during its further monitoring to determine when and how much heat to add via heaters 126, 136. In other embodiments, heaters 126, 136 can take the form of one or more coils wrapped around the exterior surface of the respective valve 124, 134.

In an alternative embodiment, two independently-controlled coils, either on separate spools or wound together on the same spool, are used to create the actuating magnetic field as well as the necessary heating for high-pressure xenon flow. The xenon fluid is routed around one or both of the coils at the high-pressure side of the valve. In one mode of operation, the coils are driven in complement, thus creating constructively-interfering magnetic fields in the magnetostrictive material and actuating the valve. In the opposite mode, the coils are driven with high current in opposition, thus creating destructively-interfering magnetic fields which do not actuate the valve, while the resistive heat generation in the coil wires creates excess heat. The excess heat is transferred to the high-pressure xenon, enabling control of the flow through the large pressure drop. Independent application of varying currents to the two coils can produce an infinite number of gradations of magnetostrictive actuation and heat generation in the valve. This implementation needs not use a stand-alone heater.

At inlet pressures above 20 to 30 bar, the states of xenon in the flow of system 100 frequently encounter the saturation curve of the gas, with some flows occurring near the critical point. This non-ideal behavior requires a more general treatment of the orifice flow equations in the design, simulation, and control of system 100.

For an isentropic choked flow starting from a stagnation enthalpy and entropy, $h_{stag}$ and $s_{stag}$, respectively, the conditions at the throat of one of valves 124, 134 satisfy Equations 1 and 2:

$$h_{stag} - h_{crit}(P_{crit}, s_{stag}) = \frac{1}{2}v_{crit}^2 \quad (1)$$

$$v_{crit} = \sqrt{\left(\frac{\partial P}{\partial \rho}\right)_s \bigg|_{(P_{crit}, s_{stag})}} \quad (2)$$

where $h_{crit}$ it is the local enthalpy at the throat, and $v_{crit}$ is the local fluid velocity at the throat, equal to the local speed of sound.

Analytical solutions exist for ideal gases, but in this case, Equations 1 and 2 are solved numerically for the critical pressure (or density), and the choked mass flow through the throat of valve 124, 134 is then given by Equation 3:

$$\dot{m} = \rho_{crit} v_{crit} C_D A \quad (3)$$

where $\rho_{crit}$ and $v_{crit}$ are the critical density and fluid velocity, respectively, A is the geometric cross sectional area of the flow, and $C_D$ is the coefficient of discharge.

For a given flow area, $C_D A$, the maximum (i.e., choked) mass flow rate through it is a function of the stagnation state, which is taken as the upstream pressure and temperature, provided the flow remains single-phase up to the throat of valve 124, 134. Thus, the throat mass flow per unit area, or mass flux, $\varphi_m(P_{stag}, T_{stag})$, is an intrinsic property of the propellant gas at a given stagnation condition.

Figure 6:
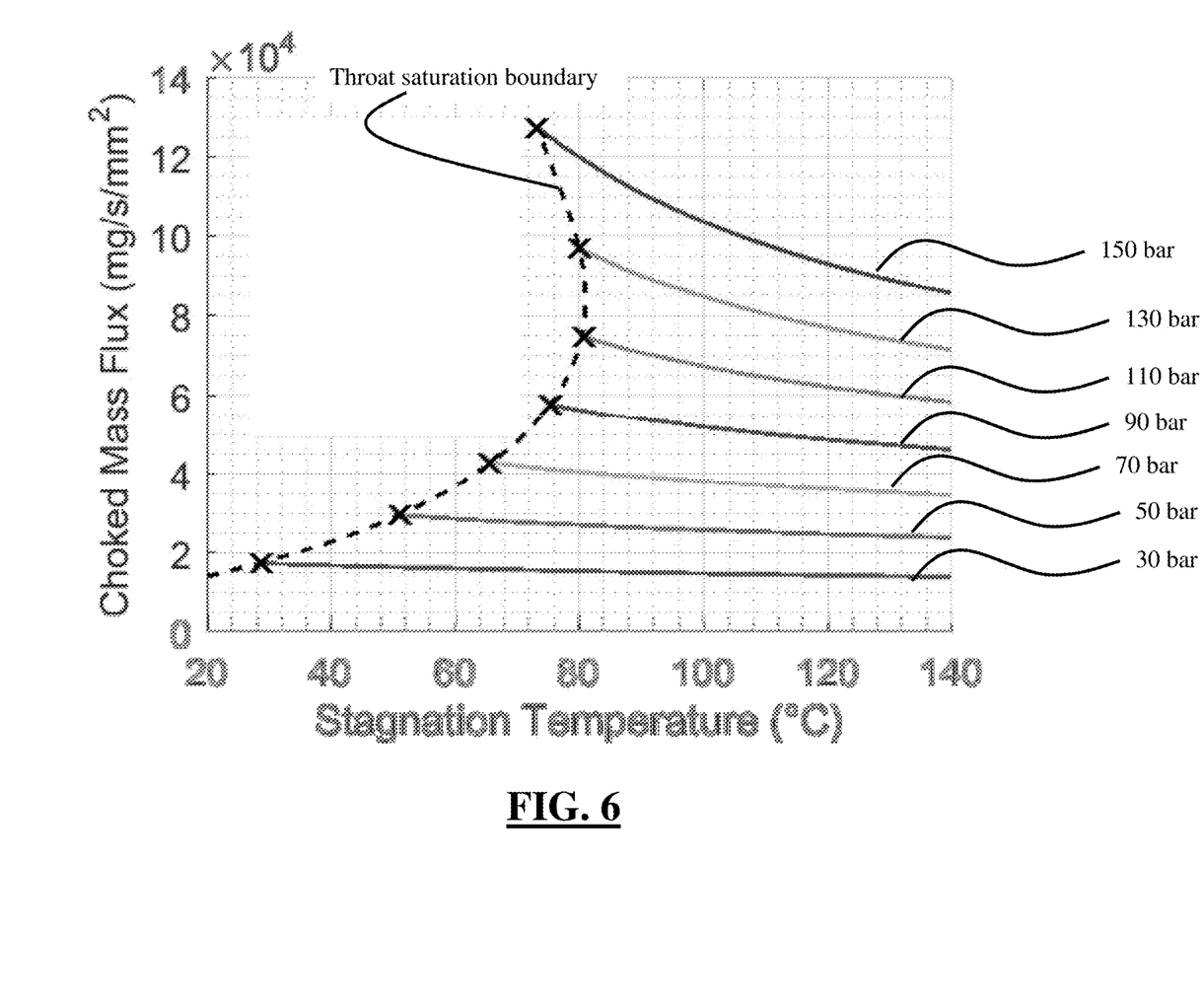
FIG. 6 is a contour plot of choked mass flux versus stagnation temperature at various stagnation pressures with respect to xenon gas.

FIG. 6 shows a contour plot of mass flux, $\varphi_m(P_{stag}, T_{stag})$, for xenon gas to display choked mass flux versus stagnation temperature at various stagnation pressures. As discussed above, system 100 is designed to use thermal control to avoid 2-phase flow in the throat of valves 124, 134. The dashed line in FIG. 6 represents the stagnation conditions which result in saturated xenon vapor in the throat of valve 124, 134 after undergoing an isentropic expansion. All upstream conditions that fall to the left of this curve in FIG. 6 will result in a 2-phase mixture of xenon at the throat. This line is referred to in the figures as the "throat saturation boundary".

Figure 7:
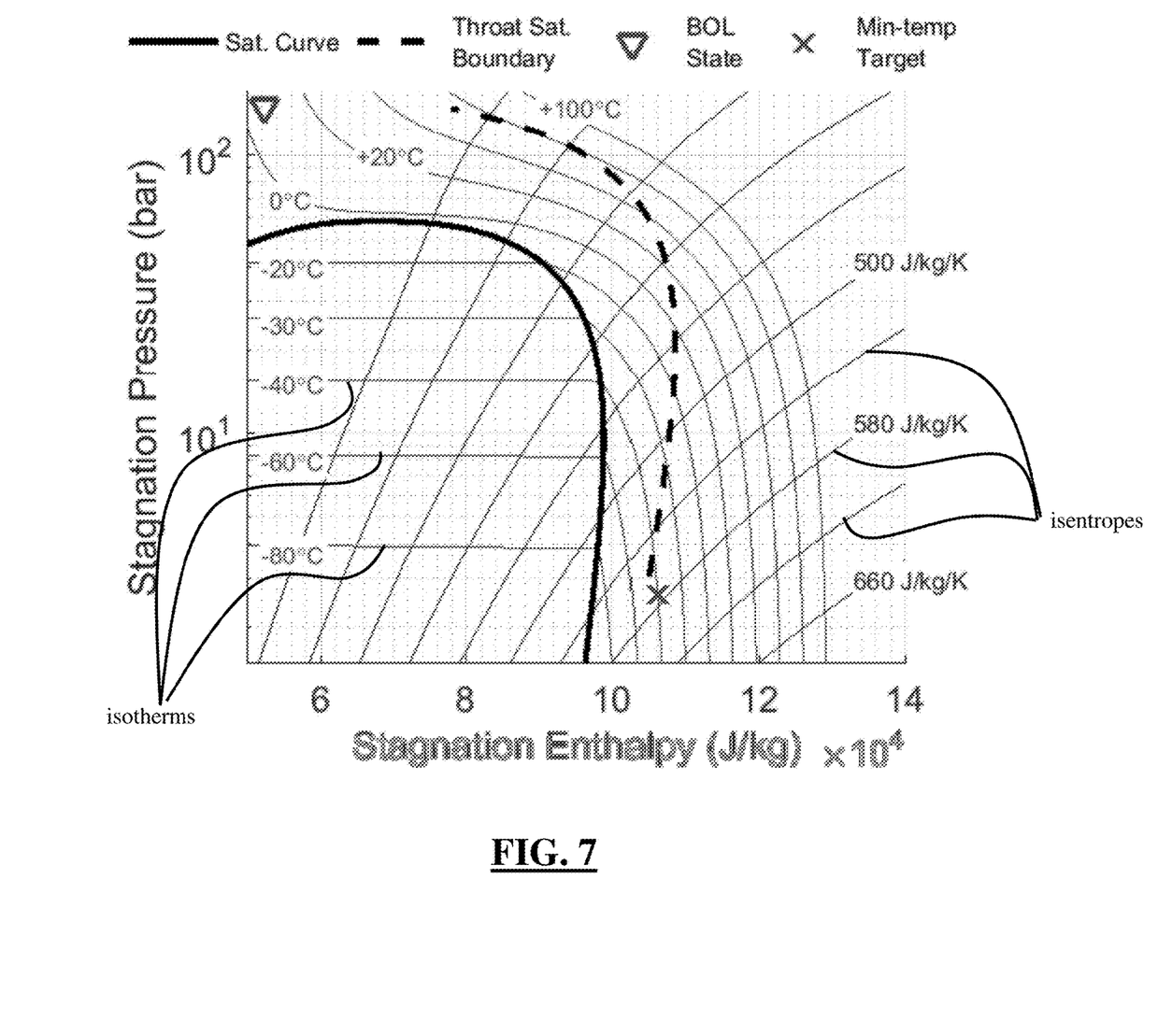
FIG. 7 is a contour plot of stagnation pressure versus stagnation enthalpy with respect to xenon gas.

FIG. 7 shows a pressure-enthalpy (P-H) contour plot of xenon gas with the saturation line and the throat saturation boundary superimposed. Isotherms are shown and spaced every 20° C. between −40° C. and +100° C. Isentropes are shown also shown. The worst-case beginning-of-life (BOL) flow conditions with respect to thermal control are depicted, which amount to the minimum system inlet temperature and maximum inlet pressure. The minimum allowable temperature of the outlet gas at the nominal target pressure is also depicted. This plot shows the specific enthalpy that must be added to the xenon flow, particularly at high inlet pressures, in order to ensure delivery of single-phase gas at the low-pressure end of valves 124, 134. The added enthalpy relates to the required xenon heating through Equation 4:

$$Q_{heat} = \dot{m}(h_{out} - h_{in}) \quad (4)$$

In the case of FIG. 7, the added enthalpy is approximately 0.050 J/mg, which corresponds to 4.5 W of heat addition at 90 mg/s of mass flow.

Figure 8:
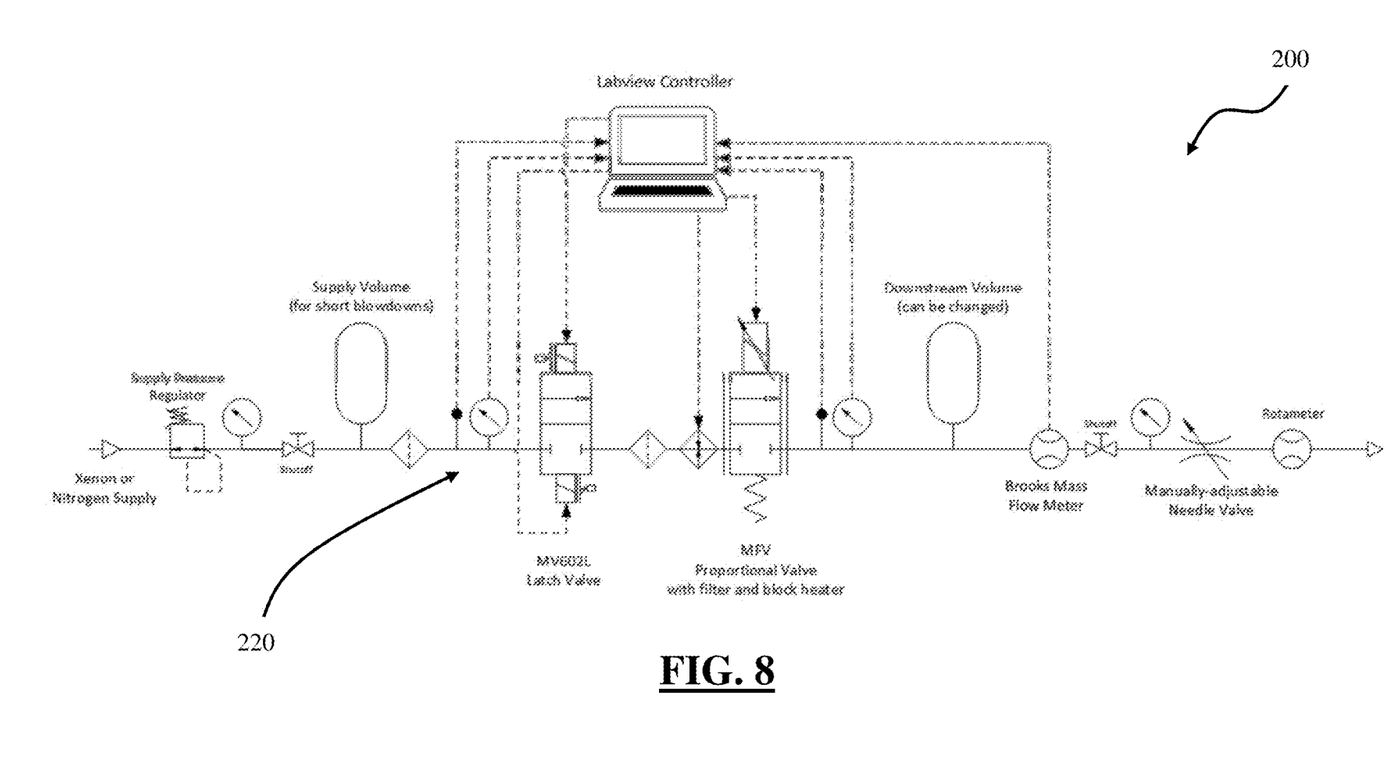
FIG. 8 is a system layout of a pressure regulation system in accordance with a second embodiment of the present invention.
Figure 9:
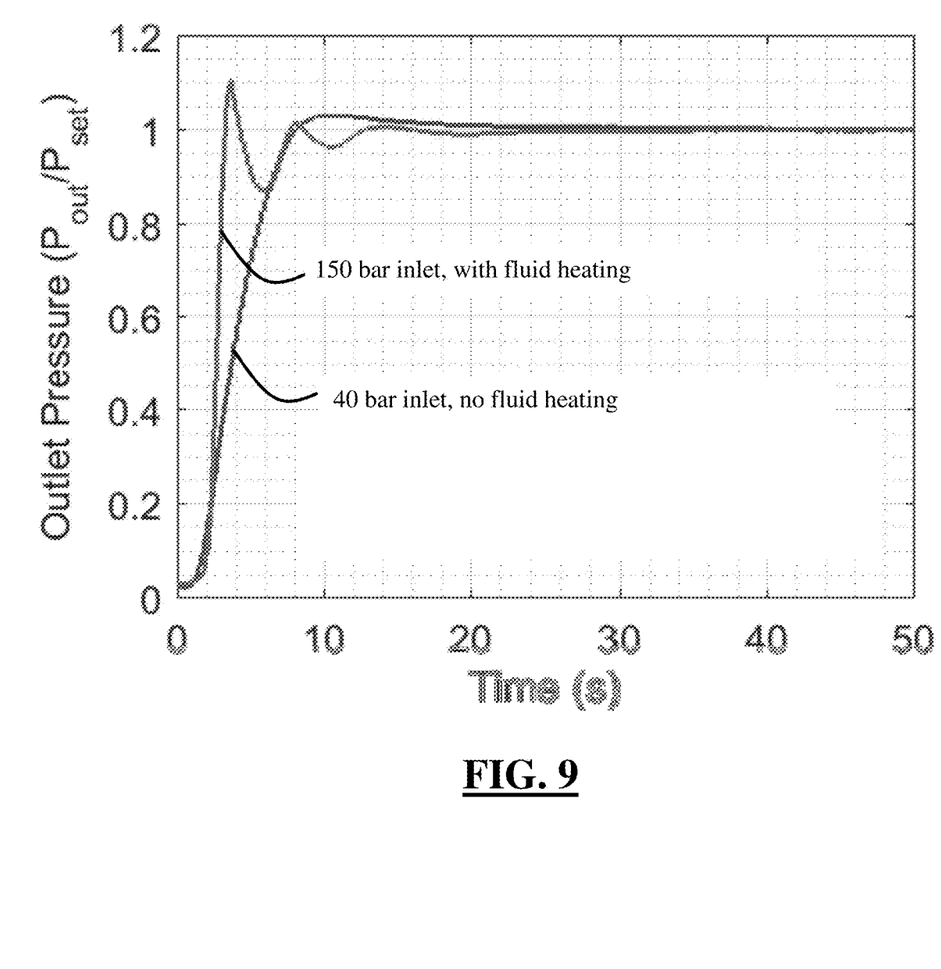
FIG. 9 is a graph showing testing results for the pressure regulation system shown in FIG. 6.

Shown in FIG. 8 is a development diagram of a simplified subsystem consisting of a single fluid control branch 220 of system 200, which is similar in nature to fluid control branch 120 described above. Testing of system 200 with xenon as a propellant is controlled by a computer equipped with LabView software. FIG. 9 is a graph depicting certain results of the testing. For example, a high-pressure test was performed at 150 bar inlet pressure with fluid heating. A low-pressure test was performed at 40 bar inlet pressure without fluid heating. Both tests were performed with identical controller gains. As shown in FIG. 9, the response of system 200 is dramatically different at differing inlet pressures. The stability of the high-pressure test is contingent on the thermal control of the fluid, as system 200 does not stabilize without the thermal control.

Testing of systems 100 and 200 has shown their capability to operate with flexible set pressures over a range of xenon inlet pressures and to perform with great accuracy. Active thermal control of systems 100 and 200 ensures stable, single-stage pressure regulation with a propellant such as xenon gas at inlet pressures up to 150 bar while managing and reducing or eliminating the effects of 2-phase flow.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electronic pressure regulation system comprising:
   an electronic control unit; and
   a fluid assembly including a fluid control branch having a proportional control valve and a heater, wherein the proportional control valve is magnetostrictively-actuated including an axial expansion element.

2. The system of claim 1, wherein the heater is a strip heater applied to an external surface of the proportional control valve.

3. The system of claim 2, wherein the strip heater is a flexible, planar sheet in which a heating element is disposed.

4. The system of claim 3, wherein the flexible, planar sheet is comprised of polyimide or the like.

5. The system of claim 3, wherein the strip heater includes a thermometer.

6. The system of claim 1, wherein the heater is secured to the proportional control valve with tape or film.

7. The system of claim 1, wherein the heater is a coil wrapped around an external surface of the proportional control valve.

8. The system of claim 1, wherein the fluid assembly further includes a latching isolation valve.

9. The system of claim 1, wherein the fluid assembly further includes a secondary fluid control branch having a proportional control valve and a heater.

10. The system of claim 9, wherein the fluid control branches are in parallel.

11. The system of claim 9, wherein the secondary fluid control branch further includes a latching isolation valve.

12. The system of claim 1, further comprising a pressure transducer interfacing with an upstream node to provide pressure telemetry of a high-pressure side of the system.

13. The system of claim 1, further comprising a pressure transducer interfacing with a downstream node to provide pressure telemetry of a low-pressure side of the system.

14. The system of claim 1, further comprising a temperature sensor interfacing with a downstream node.

15. The system of claim 1, further comprising a quantity of xenon as a propellant.

16. An all-electric satellite comprising the electronic pressure regulation system of claim 1.

* * * * *